(12) United States Patent  
Pohlan

(10) Patent No.: US 7,373,613 B2  
(45) Date of Patent: May 13, 2008

(54) VISUALIZATION OF A COMPARISON RESULT OF AT LEAST TWO DATA STRUCTURES ORGANIZED IN DIRECTORY TREES

(75) Inventor: Rudolf Pohlan, Waldbronn (DE)

(73) Assignee: Siemens AG, Munich (DE)

( * ) Notice: Subject to any disclaimer, the term of this patent is extended or adjusted under 35 U.S.C. 154(b) by 538 days.

(21) Appl. No.: 10/796,197

(22) Filed: Mar. 10, 2004

(65) Prior Publication Data  
US 2005/0015391 A1    Jan. 20, 2005

Related U.S. Application Data

(63) Continuation of application No. PCT/DE02/03011, filed on Aug. 16, 2002.

(30) Foreign Application Priority Data  
Sep. 10, 2001   (DE) ................................ 101 44 390

(51) Int. Cl.  
G06F 3/048 (2006.01)  
G06F 17/00 (2006.01)

(52) U.S. Cl. ...................................... 715/853; 707/102  
(58) Field of Classification Search ................ 715/853; 707/102  
See application file for complete search history.

(56) References Cited

U.S. PATENT DOCUMENTS 5,974,254 A * 10/1999 Hsu ............................ 717/109  
6,278,452 B1 * 8/2001 Huberman et al. ......... 715/764  
6,912,707 B1 * 6/2005 Fontes, Jr. .................. 717/113

* cited by examiner

*Primary Examiner*—Doug Hutton  
*Assistant Examiner*—Henry Orr  
(74) *Attorney, Agent, or Firm*—Sughrue Mion, PLLC

(57) ABSTRACT

A data processing system for displaying, on a graphic display unit, a comparison result of at least two data structures each organized in a respective directory tree (9,16). An improved and quicker view of the comparison result is achieved, whereby a graphically clear representation of the comparison result is formed by a single result directory tree (17), in which the structural and/or content differences between the compared directory trees are represented by defined graphical markings.

17 Claims, 4 Drawing Sheets

1. microprocessor
2. graphic display unit
2'. print unit
3. integrated memory unit
4. connecting line
5. additional memory unit
6. keyboard
7. computer mouse
8. automation system

ESDiff [Viewer / Difference Scanner]

File   View   Tools   Window   Help

Document 2

| | Attribute Name | A - Attribute Value | B - Attribute Value |
|---|---|---|---|
| ⊟ Program | Datentyp | BOOL | |
| ⊞ Runtime Sequence | I/O-Typ | IN | |
| ⊟ Block Types | invertiert | FALSE | |
| ⊞ BIT_LGC | Name | IN2 | |
| ⊞ COMPARE | S7_dynamic | TRUE | |
| ⊞ CONTROL | S7_edit | FALSE | |
| ⊞ CONVERT | S7_visible | TRUE | |
| ⊞ FLIPFLOP | Wert | 0 | |
| ⊞ MATH_FP | | | |
| ⊞ MATH_INT | | | |
| ⊞ MULTIPLX | | | |
| ⊞ OPERATE | | | |
| ⊞ SFC_CTRL | | | |
| ⊞ SHIFT | | | |
| ⊞ WRD_LGC | | | |
| Global Variables | | | |
| ⊟ Charts | | | |
| ⊟ CFC1 | | | |
|  ⊞ 1 (CTRL_PID) | | | |
|  ⊞ 2 (OP_A_LIM) | | | |
|  ⊞ 3 (AND)  — 11 | | | |
|  ⊞ 4 (OR) | | | |
| CFC2 | | | |
|  ⊞ 1 (CTRL_PID) | | | |
|  ⊞ 2 (OP_A_LIM) | | | |
|  ⊟ 3 (AND) | | | |
|    IN1 — 10 | | | |
|    IN2 | | | |
|    OUT | | | |
|  ⊞ 4 (OR) | | | |
|  ⊞ 5 (XOR) | | | |
| ⊟ SFC1 | | | |

Um zu vergleichen, bitte 2. Objekt selektieren [F2]    30.05.01    20:21

VISUALIZATION OF A COMPARISON RESULT OF AT LEAST TWO DATA STRUCTURES ORGANIZED IN DIRECTORY TREES

This is a Continuation of International Application PCT/DE02/03011, with an international filing date of Aug. 16, 2002, which was published under PCT Article 21(2) in German, and the disclosure of which is incorporated into this application by reference.

FIELD OF AND BACKGROUND OF THE INVENTION

The present invention relates to a method and a data processing system for visualizing a comparison result of at least two data structures organized in comparison trees on a graphic display unit. The directory trees stored in at least one memory unit are formed by a like hierarchical arrangement of files and/or folders, which can be compared with one another by means of a microprocessor unit to evaluate structural and/or content differences.

In the field of data processing, files that belong together are frequently stored in so-called folders. To make possible an overview of the allocation of many different folders and associated files, software products offer, for example, so-called file managers.

A file manager typically uses a graphically clear representation of the folders and files within a directory tree. A directory tree, which is a form of organizing a data structure, uses two different status images to display a folder. One status image characterizes the state of an open folder, whereas the second status image represents the folder in its closed state. Once a folder is opened, the folders and/or files contained in it become visible. By opening and closing the folders it is possible to display the branching structure of the directory tree.

The terms file and folder as used hereinafter are synonymous with any objects and object containers of any data processing formats, such as, for example, databases, XML, programming languages, etc. One necessary common feature, however, is that the data structures must be organized in a tree shape.

In practice, a frequently encountered problem is that the contents of at least two directory trees must be compared and the comparison result displayed. The comparison result then shows the differences caused by added or deleted folders and/or files and/or object attributes. Here, the identity of a file or folder is defined by its name and object type. The object attribute of a file or folder is determined by its size, modification time, etc.

Within the context of, for example, an FDA validation or a TÜV acceptance of industrial plants, a comparison of directory trees is used to show the kind of modifications and expansions made in a plant controlled by software. To show programming costs, a comparison of directory trees is typically used to demonstrate the scope of the modifications and expansions. For personal use, a comparison of directory trees may also be used to show differences between the data stored on a desktop computer and a laptop computer.

The software tool "ClearCase" (made by Rational Software Corporation, Version 3.1) is a method for visualizing a comparison result of two data structures organized in comparison trees. After a comparison of the structural or content differences of the directory trees that are to be compared, the comparison result is displayed in two separate windows arranged next to each other in which the differences are marked. The number of windows used for displaying the comparison result corresponds to the number of the directory trees to be compared. Because the differences are marked only at the beginning of a line, the user must cumbersomely move his eyes line by line from left to right to see the comparison result. Thus, the decisive drawback is the lack of a clear arrangement of the comparison result. Furthermore, in the prior art method, the comparison is possible only on a single hierarchical level of the directory tree. A comparison of the entire hierarchical arrangement, including underlying files and/or folders is not possible, and the user must do this manually for each hierarchical level. This requires a significant amount of additional time.

OBJECTS OF THE INVENTION

Thus, an object of the present invention is to provide a method as well as a data processing system for visualizing a comparison result of at least two data structures organized in comparison trees, which enables a clear display of the comparison result that the user can quickly and reliably grasp.

SUMMARY OF THE INVENTION

This and other objects are attained by a method for displaying a comparison result of at least two data structures organized in respective directory trees on a graphic display unit, wherein each of the directory trees is formed in a similar hierarchical arrangement of files or folders, the method comprising, comparing the files or folders with each other to evaluate structural or content differences between the compared files or folders, and forming a single resulting directory tree in which the structural or content differences between the compared files or folders are displayed by predefined graphic markings, wherein a graphically clear display of the comparison result is achieved.

With respect to the method, the invention includes the technical teaching that, to enable a graphically clear display of the comparison result, a single resulting comparison tree is formed in which the structural and/or content differences between the two or more files and/or folders are shown by graphic markings.

With respect to a generic-type data processing system, the invention includes the technical teaching that, for a graphically clear display of the comparison result, the single resulting directory tree can be displayed on a display unit, such that the structural or content differences between the compared files and/or folders are shown by graphic markings on the display unit.

Resulting advantages over the prior-art solutions for visualizing a comparison result include a compact display of a single result directory tree. This gives the user a clear and readily graspable overview of the differences between the compared files and/or folders. The user can navigate specifically to different files and/or folders using an input unit—such as a keyboard or a mouse—to control the graphically marked files and/or folders. The comparison process of the directory trees can advantageously be controlled via filters, which also make it possible to select object attributes and object types to be compared. Structural or content differences determined as a result of the comparison can be transferred to a sum directory tree to enable data matching as well.

Preferably, the additional files and/or folders present in one of the directory trees are graphically displayed in the result directory tree as corresponding additional files and/or folders. An additional folder can advantageously be provided with a marking that indicates to which of the directory trees the additional folder must be assigned. As a result, for example, an additional folder present in the first directory tree can be highlighted in blue, whereas an additional folder present in the second directory tree can be highlighted in green.

According to another aspect of the invention, files and/or folders that have the same identity but differ with respect to their object attributes can also be graphically marked in the result directory tree. For example, folders whose object attributes were determined to be different can be highlighted in red.

Preferably, higher-level folders, which are also referred to as container objects or parent nodes and which contain their own respective files and/or folders with different identity or object attributes, can be graphically highlighted in the result directory tree. To that extent, comparison differences are propagated up to the root node.

Object attributes of files and/or folders are preferably displayed as a list in the result directory tree. Here, differences resulting from the comparison can be formatted, for example, with different colors to achieve a clear overview. Different attributes of a file or a folder can thus be formatted in red, for example. Additional attributes present which originate from the first directory tree can be formatted in blue, for example. Additional attributes present from a second directory tree can, for example, be formatted in green.

The method for visualizing a comparison result of at least two data structures organized in directory trees as generally described above can be implemented by means of a data processing system that includes a graphic display unit on which the directory trees can be displayed on a graphic user interface. The data processing system further includes at least one memory unit to store the directory trees formed by a like hierarchical arrangement of files and/or folders. The comparison is done by a microprocessor unit, which is used to evaluate structural or content differences of the directory trees to be compared. After the comparison process, the display unit displays the comparison result in the form of a single result directory tree in which the structural or content differences are visualized by defined graphic markings—e.g., color markings or color formatting or added graphic symbols. The graphic marking, in terms of the present invention, may also take the form of a pictogram that indicates the difference and replaces the original pictogram of the file and/or the folder.

BRIEF DESCRIPTION OF THE DRAWINGS

Other features enhancing the invention are set forth in the dependent claims or are described below in greater detail, by way of example, with reference to a preferred embodiment of the invention depicted in the figures in which:

FIG. 3 shows a second directory tree to be compared.

DETAILED DESCRIPTION OF THE PREFERRED EMBODIMENTS

Figure 1:
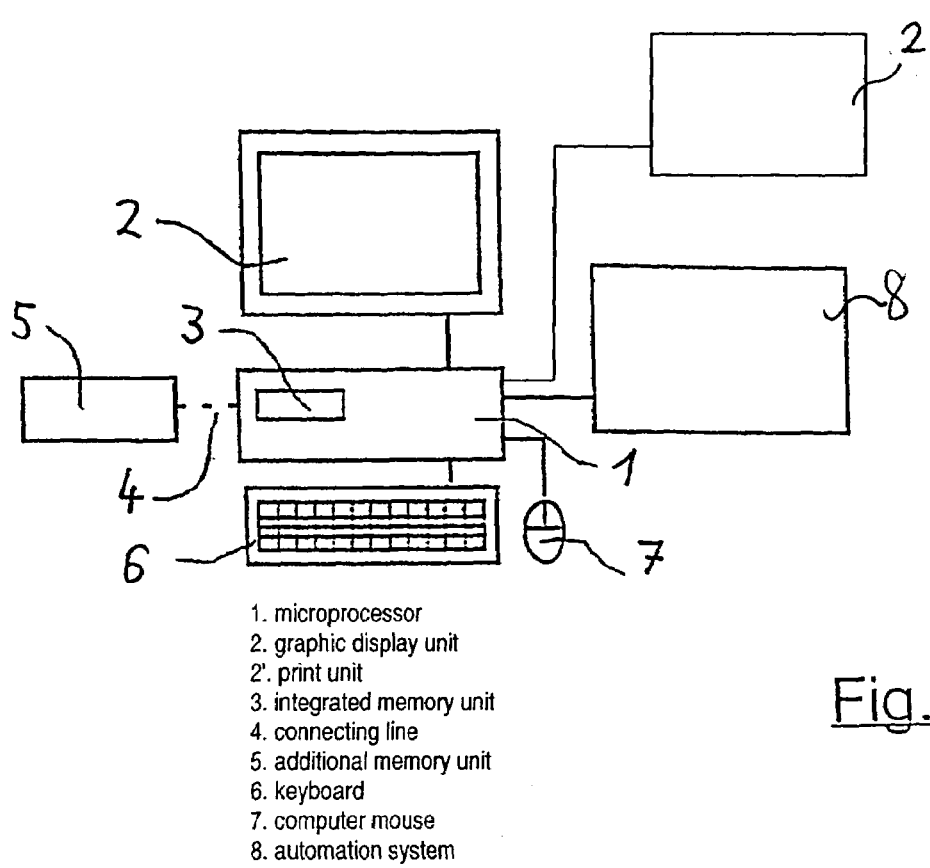
FIG. 1 is a schematic of a data processing system for visualizing a comparison result of at least two data structures organized in directory trees according to the invention.

FIG. 1 is a schematic illustration of a data processing system in accordance with the present invention for visualizing the comparison result between two or more compared files and/or folders. The system of FIG. 1 includes a microprocessor unit 1, such as a personal computer, to which are connected a graphic display unit 2, such as a computer monitor, and a print unit 2'. The microprocessor unit 1, in addition to an integrated memory unit 3, like a hard disk, has other integrated electronic memory units (not shown). Via a connecting line 4 it is possible to connect an additional memory unit 5, for example that of a host computer. The microprocessor unit 1 is operated by means of a keyboard 6 and a computer mouse 7 used as input units. The data processing system shown is used, for example, to configure or control an automation system 8.

To validate control engineering modifications and expansions within the scope of this application, a comparison result of data structures calculated in the microprocessor unit 1 is visualized on the graphic display unit 2.

Figure 2:
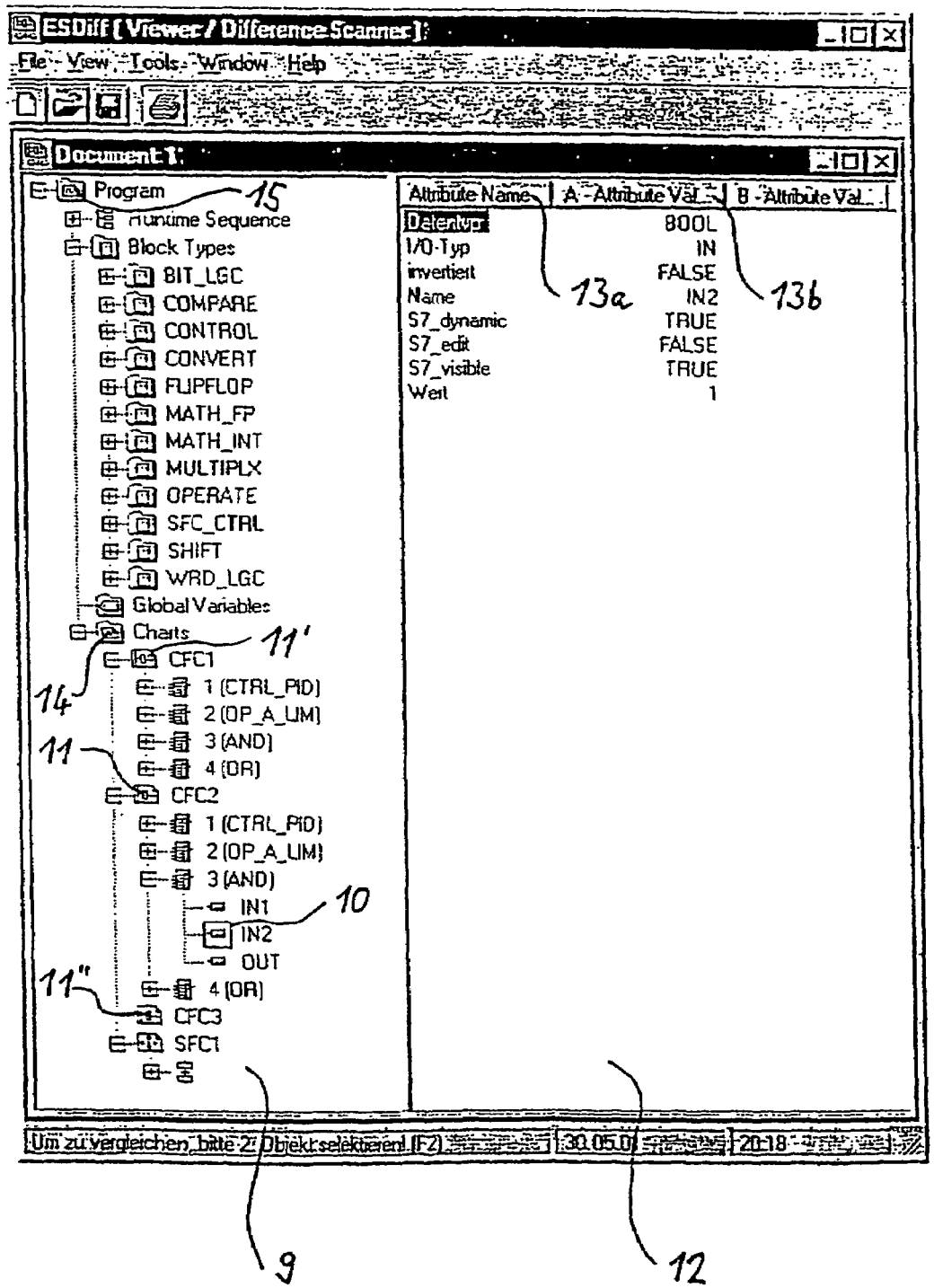
FIG. 2 shows a first directory tree to be compared.

The first directory tree 9 depicted in FIG. 2 contains a hierarchical arrangement of files 10 and folders 11. The files 10 and folders 11 graphically displayed on the display unit 2 as the directory tree 9 are in this case stored in the memory unit 3 of the microprocessor unit 1. Next to the directory tree 9, a list 12 lists the object attributes 13a, 13b of the respectively selected file 10 or the respectively selected folder 11. The object attribute 13a contains names in a first column, whereas the object attribute 13b shows the value thereof in a second column. Associated with the folders 11 "CFC2," 11' "CFC1," and 11" "CFC3," which are arranged in the directory tree 9 on one hierarchical level, is a higher-level folder 14 named "charts," which contains the folders 11, 11', and 11". The higher-level folder 14 in turn is contained in a higher-level folder 15 named "program."

In addition to this first directory tree 9, a second directory tree 16 to be compared therewith and depicted in FIG. 3 also has corresponding files 10 and folders 11, which are organized in a like hierarchical arrangement, as described above.

Figure 4:
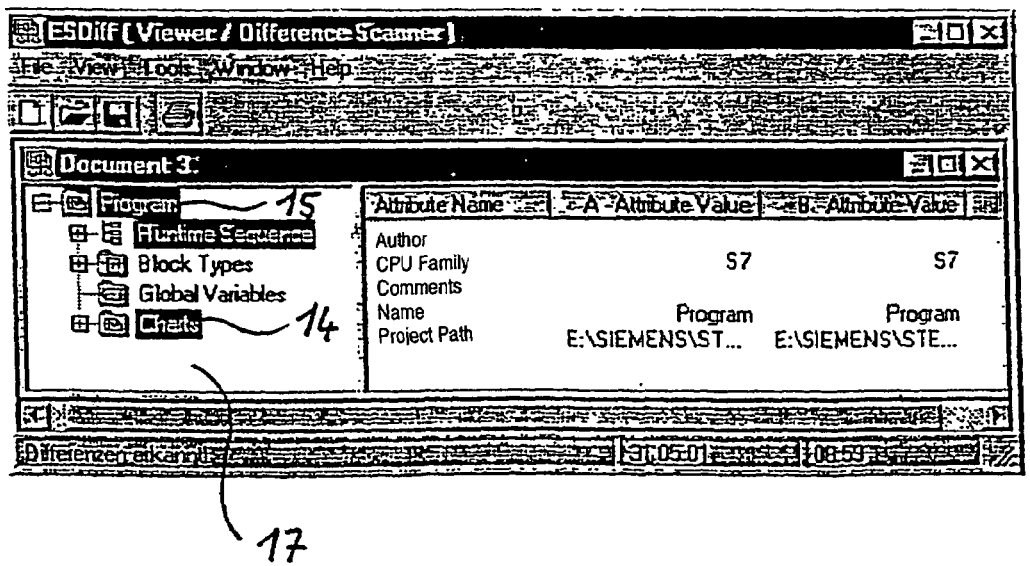
FIG. 4 shows a result directory tree.

According to FIG. 4, after the computer internally evaluates the structural and/or content differences of the above-described directory trees 9, 16, a result directory tree 17 that represents the comparison result is displayed. The structural and/or content differences of the compared directory trees 9, 16 are made visible in the result directory tree 17 by defined graphic markings. All the differences can be recognized by the highest-level folder 15, which carries a color marking (red). This color marking (red) is propagated down to the folder 14, which actually contains the content differences.

Figure 5:
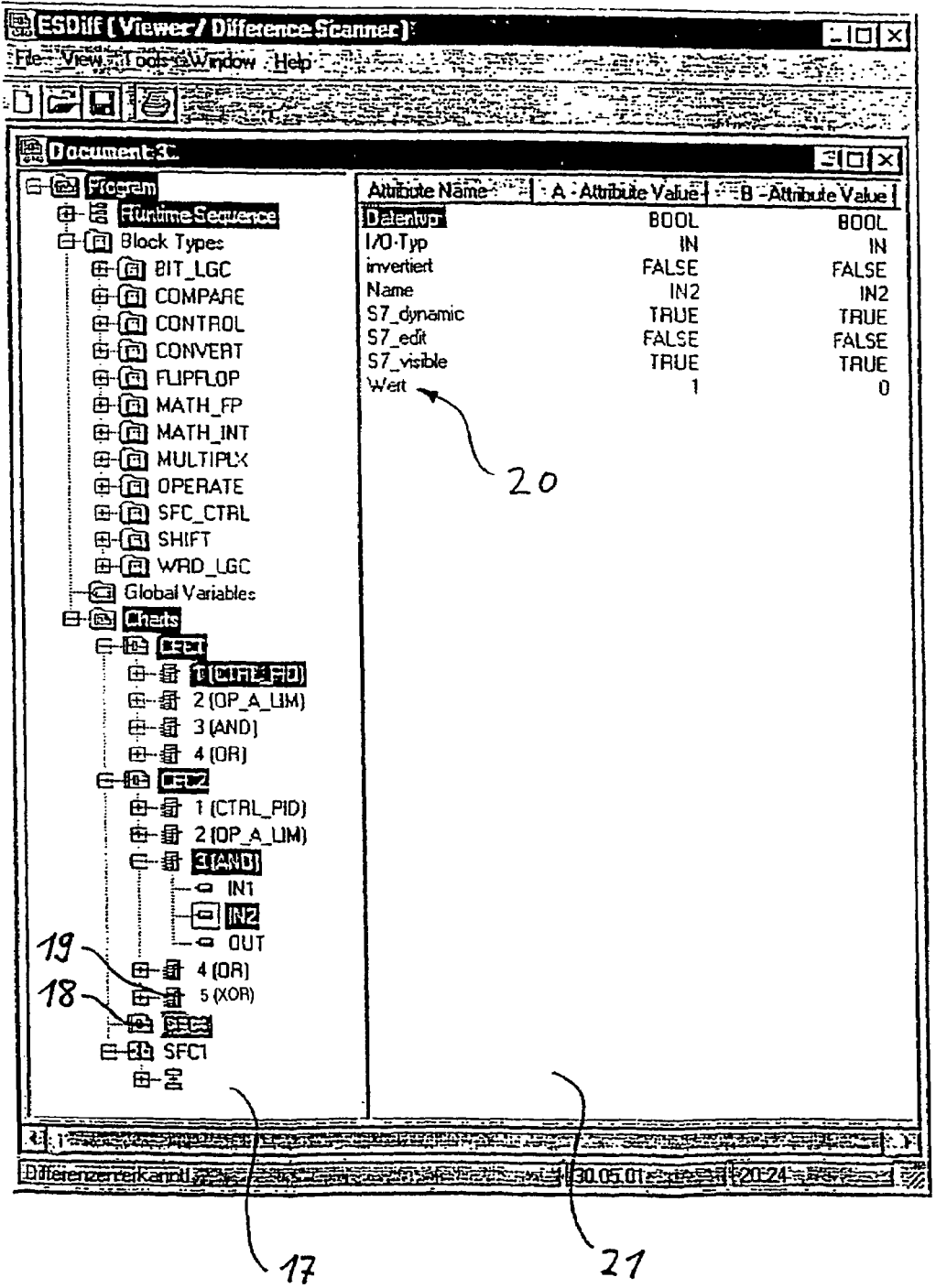
FIG. 5 shows a detailed display of the result directory tree according to FIG. 4.

According to the more detailed structural representation of the result directory tree 17 shown in FIG. 5, a color marking (blue) of the folder 18 "CFC 3" makes clear that this is an additional folder present in the first directory tree 9, which is not contained in the second directory tree 16. The folder 19 "5 (XOR)," which is identified by a different color marking (green) is additionally contained in the second directory tree 16 but not in the first directory tree 9. A color marking (red) of the file 10 "IN 2" indicates that the file 10 has a changed object attribute 20. The object attribute 20 designated "value" is defined as "1" in the first directory tree 9 and as "0" in the second directory tree 16. In addition, the result directory tree 17, with the color marking (red) through the higher-level folders 14 and 15 up to the top of the hierarchical arrangement, indicates the presence of structural and/or content differences in the directory tree 9 as compared to the directory tree 16.

The visualization of the comparison result of the two directory trees 9 and 16, which is realized by the result directory tree 17 as shown above, gives the user a better and more rapid overview of the comparison result.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for displaying a comparison result of at least two data structures organized in respective directory trees on a graphic display unit, wherein each of a first directory tree that is compared with a second directory tree is formed in a hierarchical arrangement of files, folders or a combination of files and folders, the method comprising:
   comparing the files or folders of the first directory tree with the second directory tree for which a comparison is desired to evaluate structural or content differences between the compared files or folders;
   forming a single result directory tree in which the structural or content differences between the compared files or folders are displayed on each of a plurality of upper levels of the result directory tree by predefined graphic markings; and
   displaying the single result directory tree on the graphic display unit,
   wherein the predefined graphic markings indicate origin of difference of the compared files or folders.

2. A method as claimed in claim 1, further comprising:
   graphically displaying, in the single result directory tree, additional files or folders that are present in one of the compared directory trees as corresponding additional folders.

3. A method as claimed in claim 2, wherein the corresponding additional folders are provided with corresponding predefined graphic markings to indicate the directory tree that contains the additional folder.

4. The method as claimed in claim 2, wherein the additional files or folders that are present in one of the compared directory trees, are provided with a marking when they appear in the single result directory tree,
   wherein the marking indicates to which of the directory trees the additional file or folder must be assigned.

5. The method as claimed in claim 1, wherein:
   the predefined graphic markings comprise a first type of graphic markings and a second type of graphic markings, and
   additional folders of the first directory tree not present in the second directory tree are depicted with the first type of graphic markings in the result directory tree and wherein additional folders of the second directory tree not present in the first direction tree are depicted with the second type of graphic markings in the result directory tree.

6. The method as claimed in claim 5, wherein the predefined graphic markings further comprise a third type of graphic markings indicating that folders or files of the first directory tree are not present in the second directory tree and that folders or files of the second directory tree are not present in the first directory tree and wherein an upper folder that comprises the additional folders of the first directory tree and the additional folders of the second directory tree is depicted with the third type of graphic markings in the result directory tree.

7. A method as claimed in claim 1, wherein the files or folders that have the same identity but differ with respect to the respective object attributes are graphically identified in the single result directory tree.

8. A method as claimed in claim 1, wherein higher-level folders, which contain the files or folders with a different identity or with different object attributes, are graphically marked in the single result directory tree.

9. A method as claimed in claim 1, wherein the files and folders, that are identically present with respect to their identity and object attributes in the compared directory trees, are shown unmodified in the single result directory tree without any additional predefined markings.

10. A method as claimed in claim 1, wherein object attributes of the files or folders are displayed as a list in the single result directory tree in which the differences resulting from the comparison are graphically marked.

11. The method as claimed in claim 1, wherein the structural or content differences between the compared files or folders are graphically highlighted in the single result directory tree through all levels up to the top of the hierarchical arrangement so that the comparison differences are propagated up to the root node.

12. The method as claimed in claim 1, wherein, when the structural and content differences between the compared files or folders are only in a lower level of the display result tree, displaying the differences in a corresponding upper level of the result directory tree via the predefined graphic markings.

13. The method as claimed in claim 1, wherein the files and folders, that are identically present in both the first and second directory trees, are shown in the single result directory tree in the same manner as in the first and second directory trees without any of the predefined graphic markings.

14. A data processing system for displaying a comparison result of at least two data structures organized in directory trees, the system comprising:
   a memory unit operable to store the directory trees, wherein the directory trees are each formed in a hierarchical arrangement of files, folders or a combination of files and folders;
   a microprocessor unit operable to compare and evaluate structural or content differences between the stored directory trees; and
   a graphic display unit operable to display a graphical display of the comparison result, which comprises a single result directory tree in which the structural or content differences between the compared directory trees are displayed by predefined graphic markings which show origin of difference of the compared files or folders on each of a plurality of upper levels of the graphic display unit.

15. A data processing system as claimed in claim 14, wherein the predefined graphic markings comprise at least one of various color markings and graphic symbols.

16. A data processing system as claimed in claim 14, wherein the graphic predefined markings comprise at least one pictogram that indicates the differences between the directory trees and replaces an original pictogram of the file or the folders of the compared directory trees.

17. A data processing system as claimed in claim 14, further comprising a print unit operable to print various information, wherein the differences in the compared directory trees are printed out in list form on said print unit or stored as a file in said memory unit.

* * * * *